March 15, 1966   U. SCHÖTTLE ETAL   3,241,117
SPACE INFORMATION AND RESERVATION SYSTEM
Filed Oct. 5, 1961   15 Sheets-Sheet 1

INVENTORS.
ULRICH SCHÖTTLE
BY ROBERT PILOTY
ATTORNEY

March 15, 1966 U. SCHÖTTLE ETAL 3,241,117
SPACE INFORMATION AND RESERVATION SYSTEM
Filed Oct. 5, 1961 15 Sheets-Sheet 4

INVENTORS.
ULRICH SCHÖTTLE
BY ROBERT PILOTY
ATTORNEY

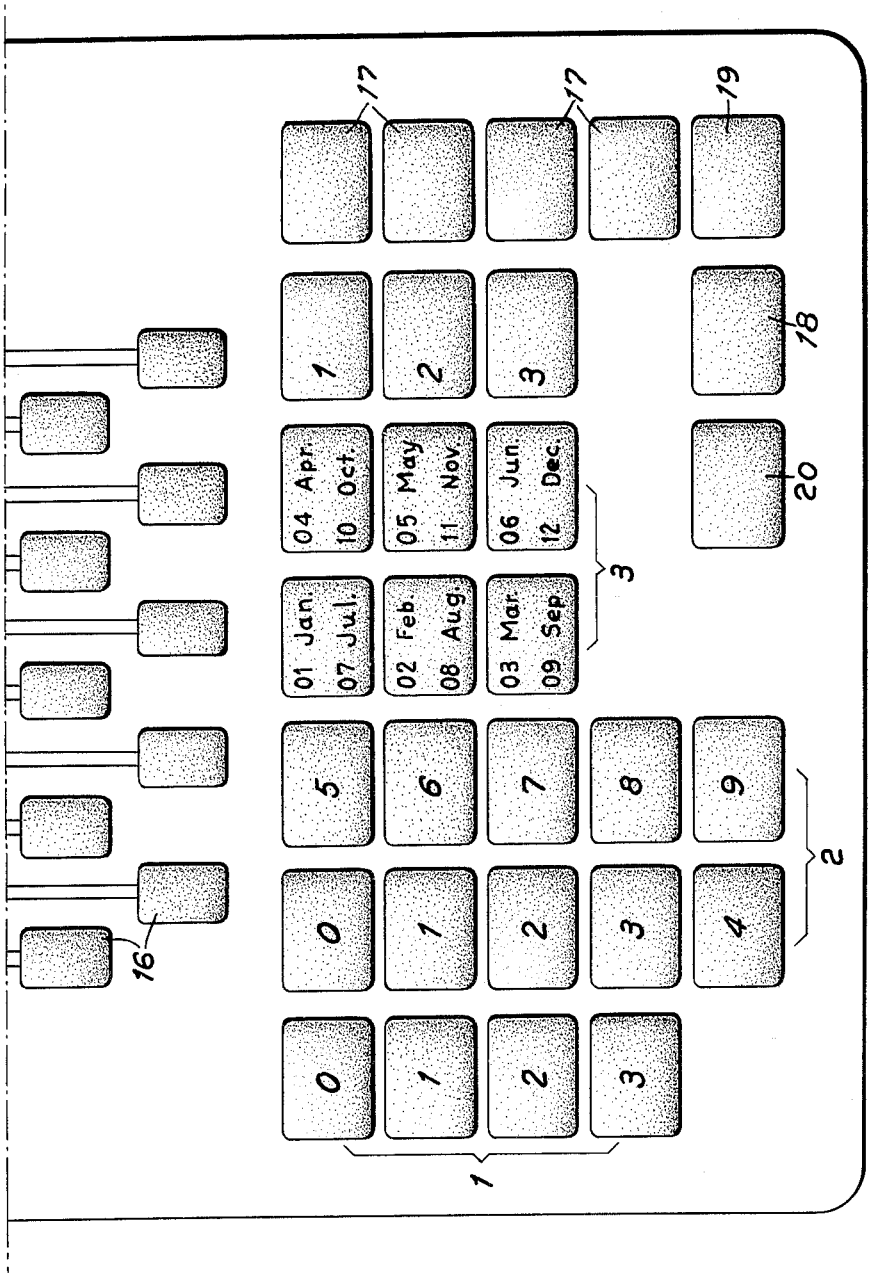

March 15, 1966  U. SCHÖTTLE ETAL  3,241,117
SPACE INFORMATION AND RESERVATION SYSTEM
Filed Oct. 5, 1961  15 Sheets-Sheet 13

INVENTOR
U.SCHOTTLE-
R.PILOTY

BY

ATTORNEY

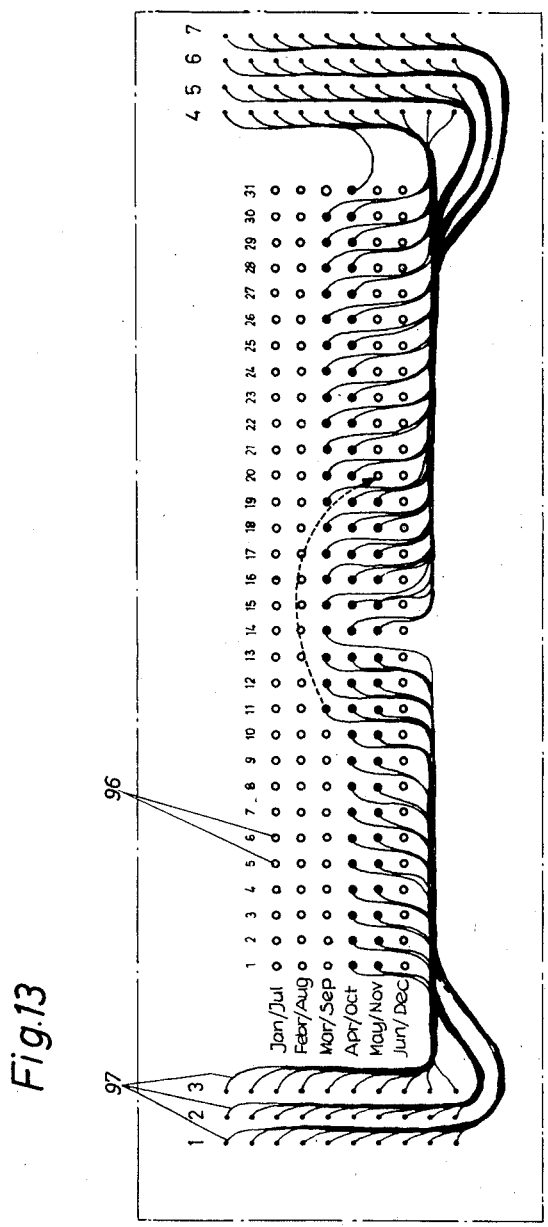

3,241,117
SPACE INFORMATION AND RESERVATION SYSTEM
Ulrich Schöttle, Stuttgart, and Robert Piloty, Stuttgart-Kaltental, Germany, assignors, by mesne assignments, to International Standard Electric Corporation, New York, N.Y., a corporation of Delaware
Filed Oct. 5, 1961, Ser. No. 151,589
Claims priority, application Germany, Mar. 21, 1958, St 13,561
5 Claims. (Cl. 340—153)

This invention relates to a system for providing informations regarding available space or accommodations, as well as to a system for space reservation, and is a continuation-in-part of our copending application Serial No. 800,187, filed March 18, 1959, and now abandoned. Systems of this type are suitable for employment, e.g., with railroad and air traffic. It is the object of such systems to provide information as to whether the seats requested by prospective passengers for specific flights or trains on a predetermined date are available, and to carry out a corresponding booking or reservation of the space. Upon requesting reservations the space is supposed to be reserved immediately, if possible, in the name of the customer. If no accommodations are available the customer may be informed that the seats are sold, and his name can then be entered on a waiting list, or he may be informed of alternate travel possibilities.

Previously the information was given by the clerk, and the booking of the reserved seats was almost exclusively performed by hand. The indication of the space availability was effected at the outlying stations by means of large-size charts from which the information operators read the space allotments of the individual trains or flights. As a rule, these charts were operated manually from a central station.

Space reservation systems, in which it is possible to provide automatic availability information, have also become known. To this end a storage device is provided at the central or master station, containing the available number of seats in the train or flight, which can be automatically read off. In most cases counting mechanisms are provided for this purpose. They are ordinarily adapted or set to the maximum number of seats, and are switched back upon each reservation by the corresponding number, until they are finally returned to the zero position. Such types of availability information systems may be sufficient where space reservations are made without names. In many cases, where it is desirable to reserve the seats in the name of the customer it has become known to provide a central booking device containing automatically selectable files relating to the individual train movements or flights which can be selected by a telephone call from the information operator's position, and fed to the operating personnel at the central office. At the central office the reservation of the seat as well as the acknowledgement of the booking to the information operator's position may then be performed.

On the whole, however, such systems bear the disadvantage that the information regarding the space availability is directed to a specific train or flight, and no automatic substitution exists in case the seats have been sold. For quickly providing the customer with substitute possibilities, the information operators must not only have considerable geographical knowledge, but they must almost know the timetable (schedule) by heart.

Hence it is an object of this invention to provide a space information and reservation system in which the informations regarding the space availabilities as well as the reservation or booking itself can be carried out automatically, and which without requiring any complicated alterations, may be easily extendable.

The system according to the invention is characterized in that a plurality of operator's positions which can be selectively connected to a central electronic device or machine, are provided for receiving the requests, and in that an electronic apparatus containing a storage device operable from the operator's positions, in which the availability of the travel possibilities with respect to all partial routes, as well as, independently thereof, of all partial route combinations, is adjustable with respect to every day of the "advance reservation period"; and in that means are provided for automatically calling up, in a single operation, at each operator's position all scheduled trains or flights referring to one specific date, and for simultaneously indicating the availability of accommodations at the calling operator's position in a manner visible to the human eye.

Besides avoiding the aforementioned disadvantages of conventional types of space information systems, it is a further object of this invention that statements of availability information not only refer to the individual partial routes, but also to all combinations thereof, and that furthermore simultaneous indications of all travel possibilities, on one specific date, between the starting location and desired destination are provided.

In this way, it is possible in the case of long routes for short sections of the route to be treated differently than long sections. Therefore, it is possible that the space reservation can be carried out in an economically optimum manner, unlike the conventional systems in which only the availability of the individual partial routes can be indicated. For instance, in the case of a train movement between the locations A, B and C, the route extending between A and B may be blocked, although on the route extending from A to C indicated seats are still available.

For achieving optimum adaptability of the system to seasonal variations and traffic requirements, it is appropriate that the availability is not entered automatically, but manually by a responsible operator. The storage system will then always have the informations ready for all train movements or flights lying within a predetermined period of time ahead. This so-called "advance reservation period" can be chosen within certain limits.

Several operator's positions, to which the incoming requests are routed, can be connected at will to the central electronic apparatus. One or more magnetic drums may be used as an availability storage device. On these drums are stored signals representing the statements "Yes," "No," "Attention" and "Not Available" with respect to all travel possibilities. Each operator's position is provided with a keyboard desk comprising buttons for feeding-in data which are necessary for giving an availability information regarding a travel reservation possibility, as well as with lamps for indicating automatically, availability information.

For assigning the storage device to the respective route it is appropriate to provide route charts, with automatically transferrable markings, resembling a timetable, which are capable of being automatically transferred into the keyboard mechanism thus effecting the automatic controlling of the electronic apparatus. The indicating lamps are arranged in such a way on the keyboard that, in the case of an inserted route chart, the assignment of the lamps to the respective routes or train movements (flights) shown on the respective route chart is unambiguously determined. Since the route charts resemble a timetable the indicating lamps for one movement (flight) are assigned to one column of the route chart. The keys for selecting the partial routes, or partial route combinations, are likewise arranged on the keyboard in such a way that they are assigned unambiguously to the locations designated on the route chart when the chart is inserted into the device.

An automatic booking system may be connected to the system providing information, which, after feeding-in the data necessary for the space reservation and actuating the corresponding booking key, automatically selects the index card for the respective train movement or flight. This card is then fed to the operator's positions so that the booking operation may be carried out by the ticket clerk. After this operation the cards are returned to the card index. The booking is only possible when the information as given to the customer is a positive one.

The novel space information and reservation system is suitable for informations which are received by telephone as well as by teleprinter. The system can be designed in such a way that the requests which are received by teleprinter, are communicated to the operator's positions, where the respective operations are carried out, or else it may be designed so that operator's positions are located at distant or outlying points and are connected via communication channels (e.g. teleprinter channels) directly with the central electronic apparatus, for automatically gathering the information without troubling an operator.

Before giving a description of the technical details, the requirements demanded from the system described hereinafter, as well as measures and arrangements necessary for meeting these requirements are summarized to give a better understanding of the technical description of the system.

Upon interrogation, the system is to report back to the enquiring agent position the Yes/No—information referring to the individual flights taking place in the near future. The elementary event, about which the system is to provide information, is the individual flight, e.g., the possibility of boarding a certain aircraft at a certain date and at a certain place A, and to fly in a certain passenger class to a certain destination B. The information which is provided by the system, about such an elementary event, includes whether further bookings can still be accepted or not. Among the possible flights there are some with no possibility of boarding or leaving a plane between the locations A and B. These flights are referred to as flight legs (portion of flight or section of a route). As a rule, a flight is composed of a number of flight legs, which are successively passed through by the aircraft. However, the information, as provided by the system, not only depends on whether the uncommitted seat space, for all flight legs traversed by the aircraft in the course of a desired flight, is still sufficient for further bookings, but also on the financial benefits which may occur in selling long-distance flights in preference to the short-distance flights, which are contained in them. Accordingly, the availability information must be presented in such a way that longer flights comprising several flight legs or sections are indicated as being still available, while certain flight legs or sections and shorter leg groups, which from part of the long-distance flight, are indicated as being not available. For example, in the case of a flight from Mexico City via New York to Paris all bookings for the route originating in Mexico City and terminating in New York will be blocked at the beginning of the booking period in favor of flights from Mexico City to Paris, and the local flight from Mexico City to New York will only become available if one or two weeks before the actual date of the flight, it is obvious the aircraft will not be filled with long-distance passengers on this leg or section of the route.

Another aspect of the above problem which the system deals with is connection flights. These may be regarded as a unit from the booking point of view, but, when made use of, they involve the necessity of changing aircraft. In a great number of cases either the first or the last flight forming part of a connection flight, has a distinct feeder serving to make connections. In these cases it is desirable that these flights can be blocked to the local traffic in favor of passengers wishing to make use of this possibility of connection.

The aforementioned requirements are met in that for each flight (not flight leg) contained in the time table, i.e., direct flights or connection flights, a storing possibility for an availability criterion is provided which is independent of all other criteria. This particular availability criterion has four different value markings:

(a) Green,
(b) Red,
(c) Red-green,
(d) No light.

The green light indicates that seats may be booked, while the red light indicates that the flight is booked up. The red-green is provided to inform the agent at the reservation clerk's position to make a request call to the central office. At the central office it is then possible, with the aid of exact inventory numbers, to decide whether the respective booking may still be accepted or not. For example, the flight may be almost booked up, and the agents may only accept further bookings in accordance with special regulations laid down by the manager.

Since two bits are required for storing these three possibilities, a fourth possibility is already available and it is utilized for indicating connection services still contained in the storage unit, but which are no longer operated.

Accordingly, the space-availability criteria are unambiguously determined by the following data:

(1) Flight number (or flight numbers in the case of connection services),
(2) Date,
(3) Class,
(4) Termination and destination.

It will subsequently be shown that for reasons of efficient storage organization and for marking items (1) and (4) in the storage device, instead of the code numbers or code letters customarily used in airlines timetables, the position of the flight data in a standardized timetable, wherein the data is arranged in a coordinate grid pattern, may be specified in accordance with the number of the page, the column, and the line to which the data relates.

If the inventory system is to contain availability information in its storage unit for 200 daily flights, then a storage capacity for about 200,000 marked criteria, of two bits each, is required if a permanent availability of the flights with respect to a period of 70 days (10 weeks) ahead is to be inventoried. In order to minimize the customer handling wait time with respect to one request, magnetic drums are provided as storage devices. These magnetic drums have a capacity of 320,000 bits each, and a medium access or reply-back time of 10 m. sec. Thus two magnetic drums are sufficient for providing the 400,000 bits. The access time is such that up to five requests per second can be handled, which is sufficient in practice for dealing with all incoming cases.

In designing the input apparatus at the reservation clerk's position, and in determining the selecting method for the space availability information stored on the drums, care has been taken to insure that by means of one single interrogation process the availability information of all connection services, which are suitable for meeting the customer's request are maintained and indicated. The flight-enquiry desk, which is designed as a handy table set, and located at the reservation clerk's position is used as an input unit.

The aforementioned and other features and objects of this invention and the manner of attaining them will become more apparent by reference to the following description of an embodiment of the invention taken in conjunction with the accompanying drawings, wherein:

FIG. 3B shows the keyboard of the master set, bottom part,

Figure 4:
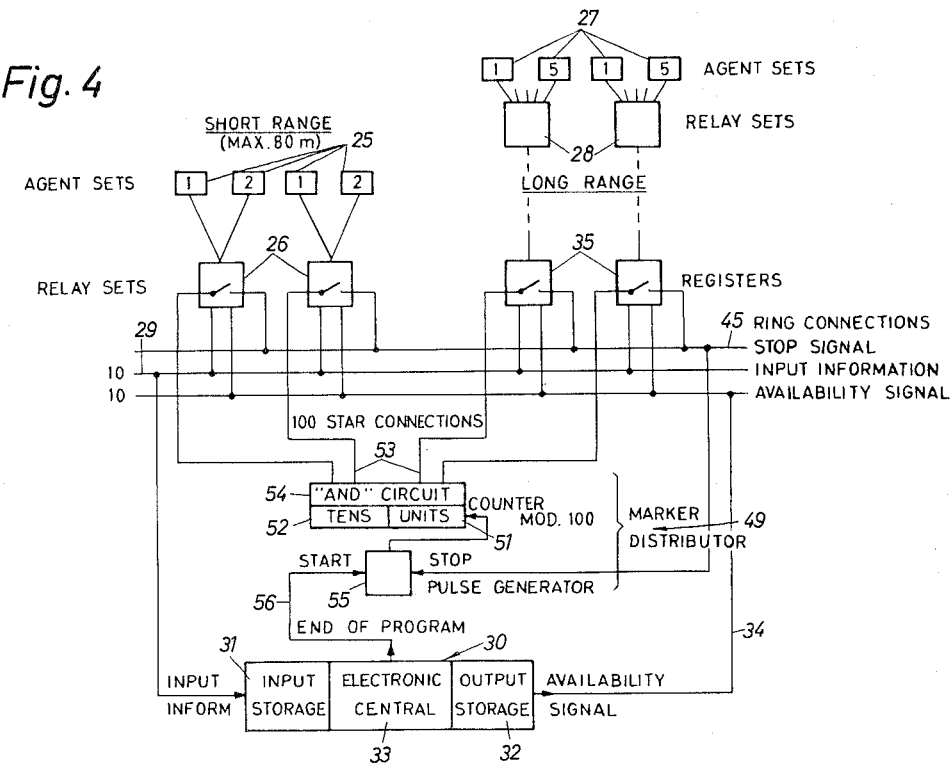
Figure 5:
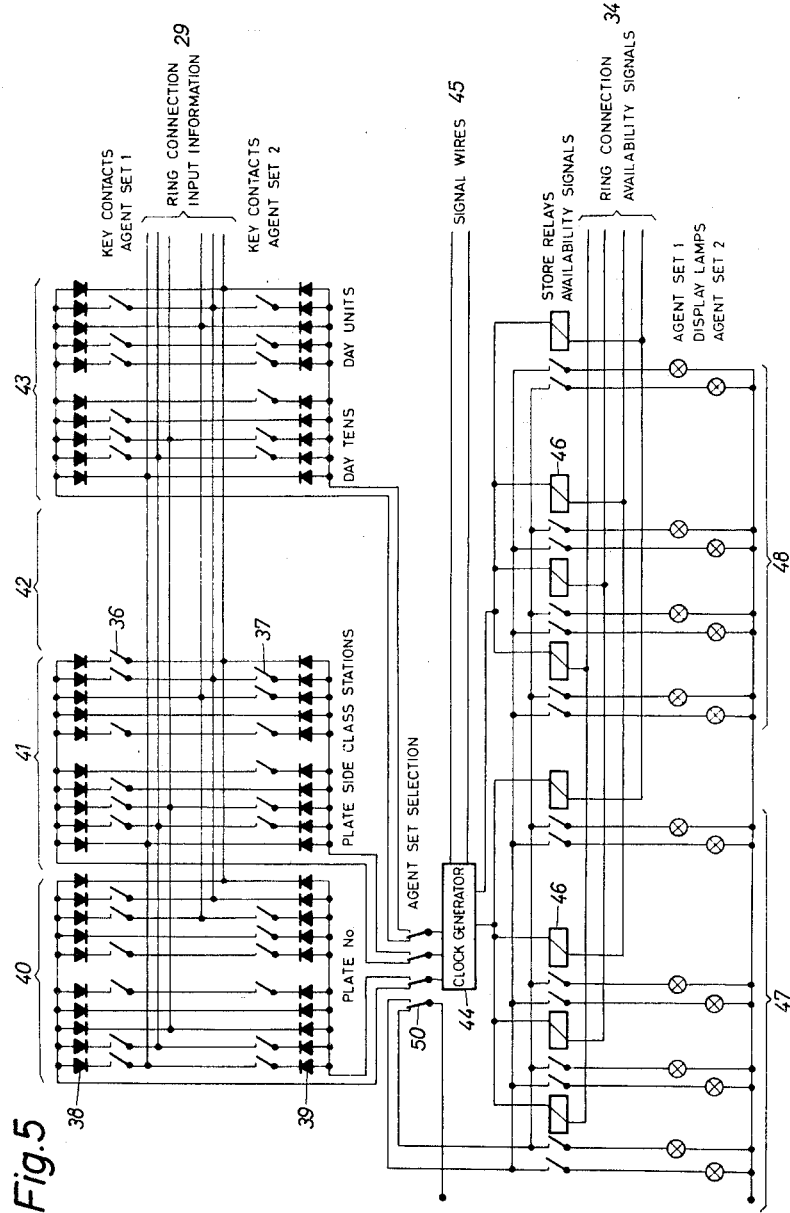
Figure 6:
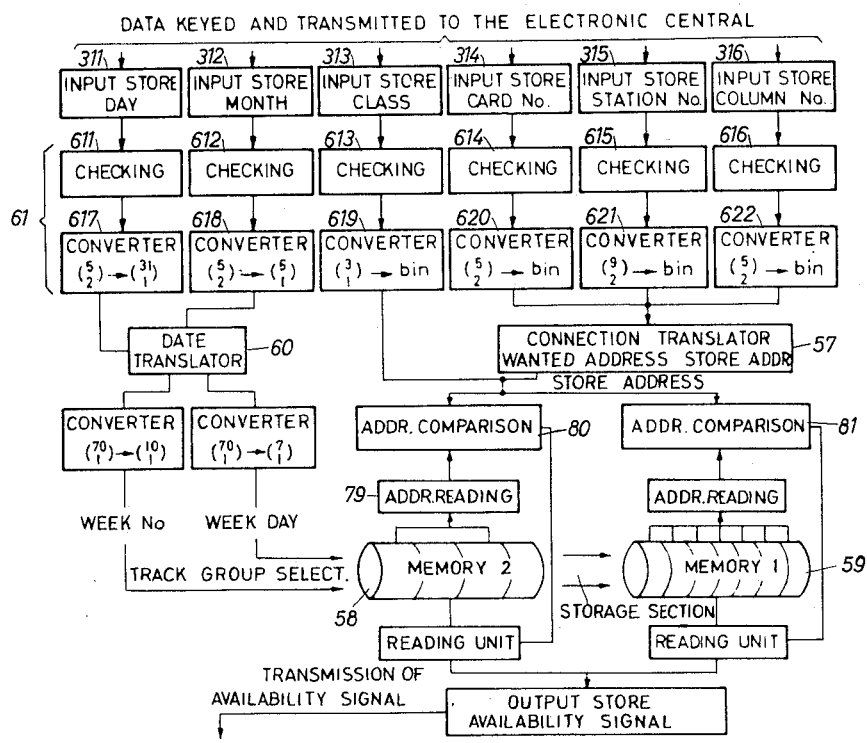
Figure 7:
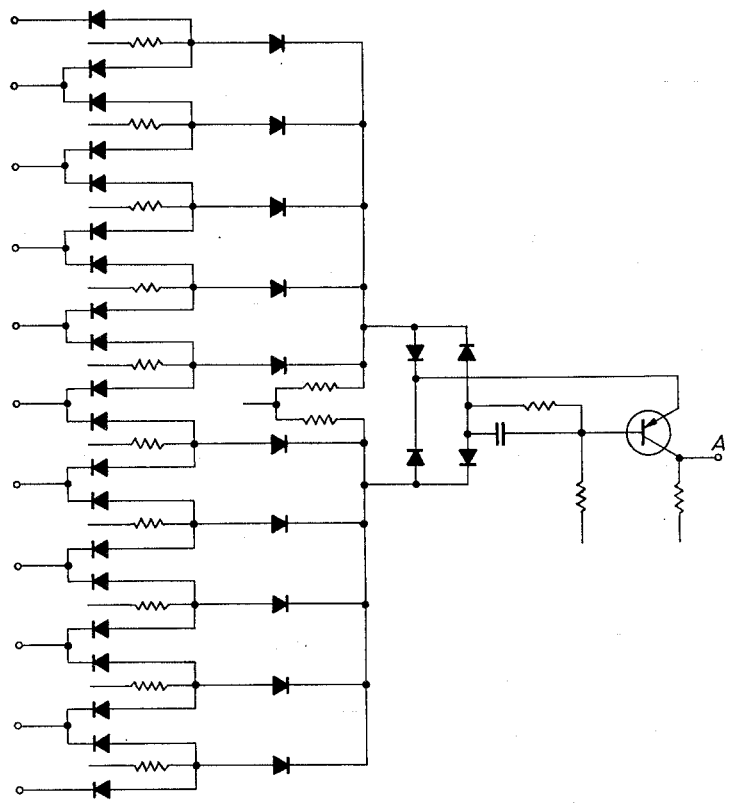
Figure 8:
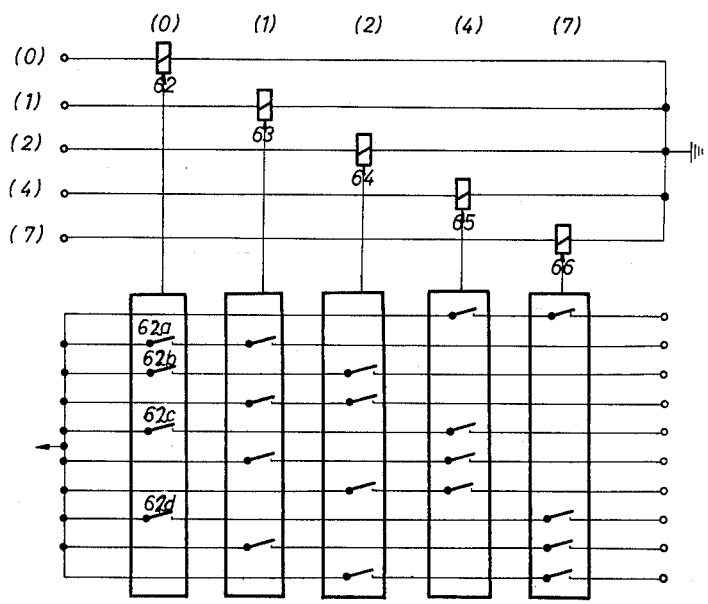
Figure 9:
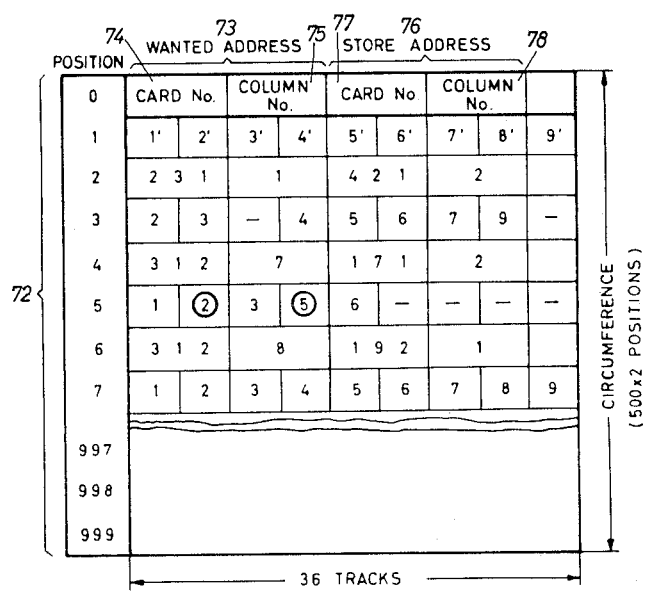
Figure 10:
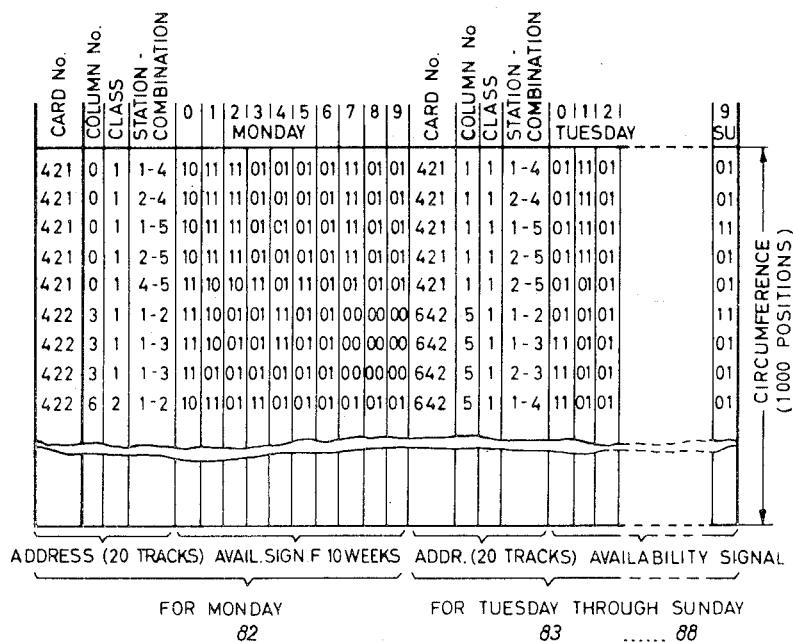
Figure 11:
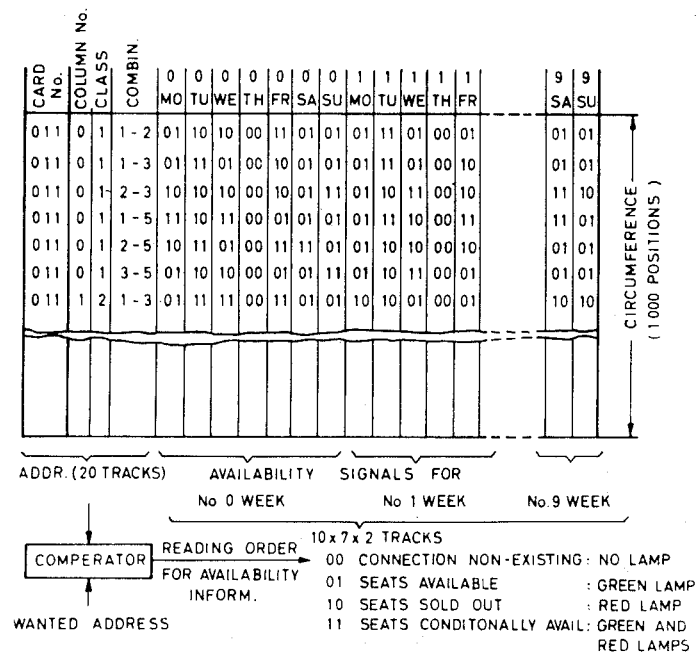
Figure 12:
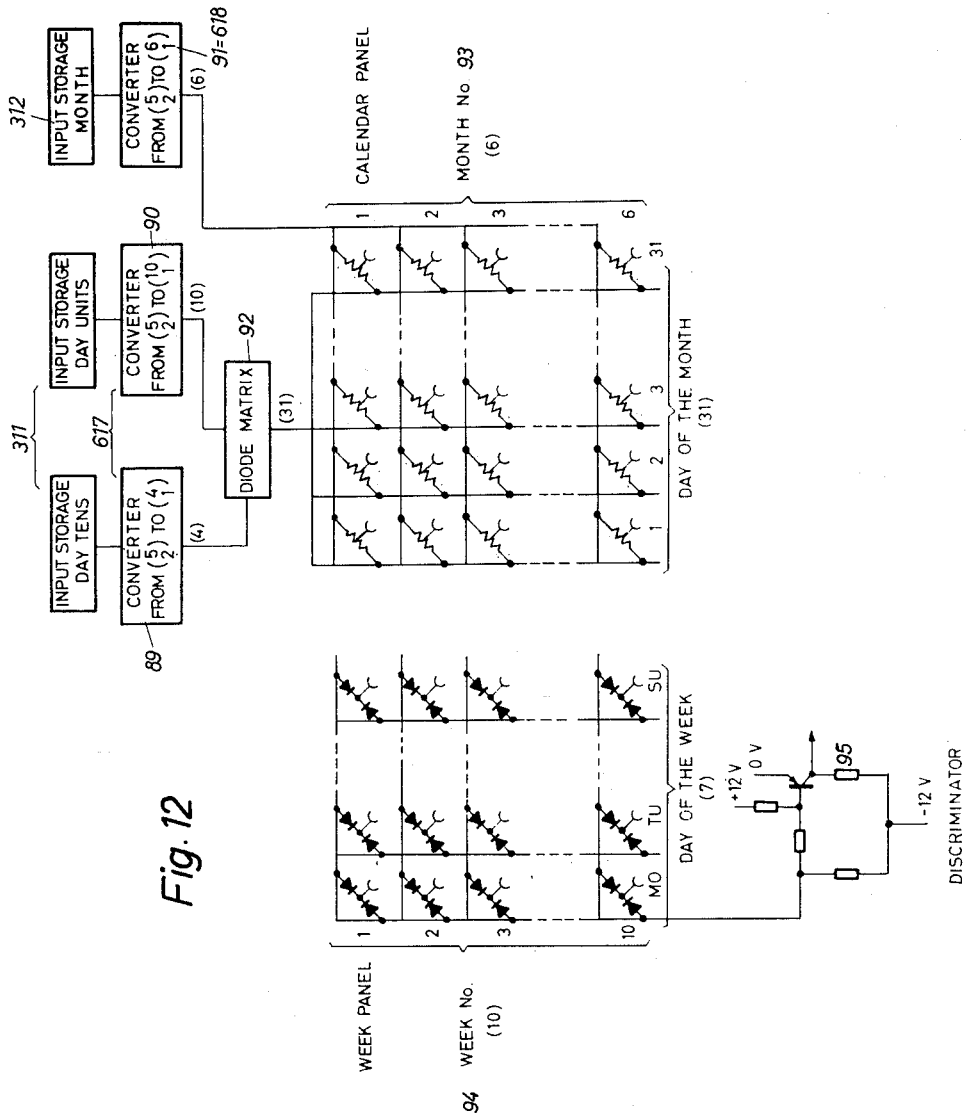

FIG. 4 shows the wiring diagram of the information transmission and marker distributor, FIG. 5 shows the relay set for short range, FIG. 6 shows the central processing system, FIG. 7 shows the arrangement for the "2 out of 5"-code checking, FIG. 8 shows the arrangement for the code conversion from the "2 out of 5" into the "1 out of 10"-code, FIG. 9 shows the arrangement of the connection translator, FIG. 10 shows the arrangement of the information memory of the one storage drum, FIG. 11 shows the arrangement of the information memory of the other storage drum, FIG. 12 shows the date translator, and FIG. 13 shows the socket panel of the date translator.

Figure 1A:
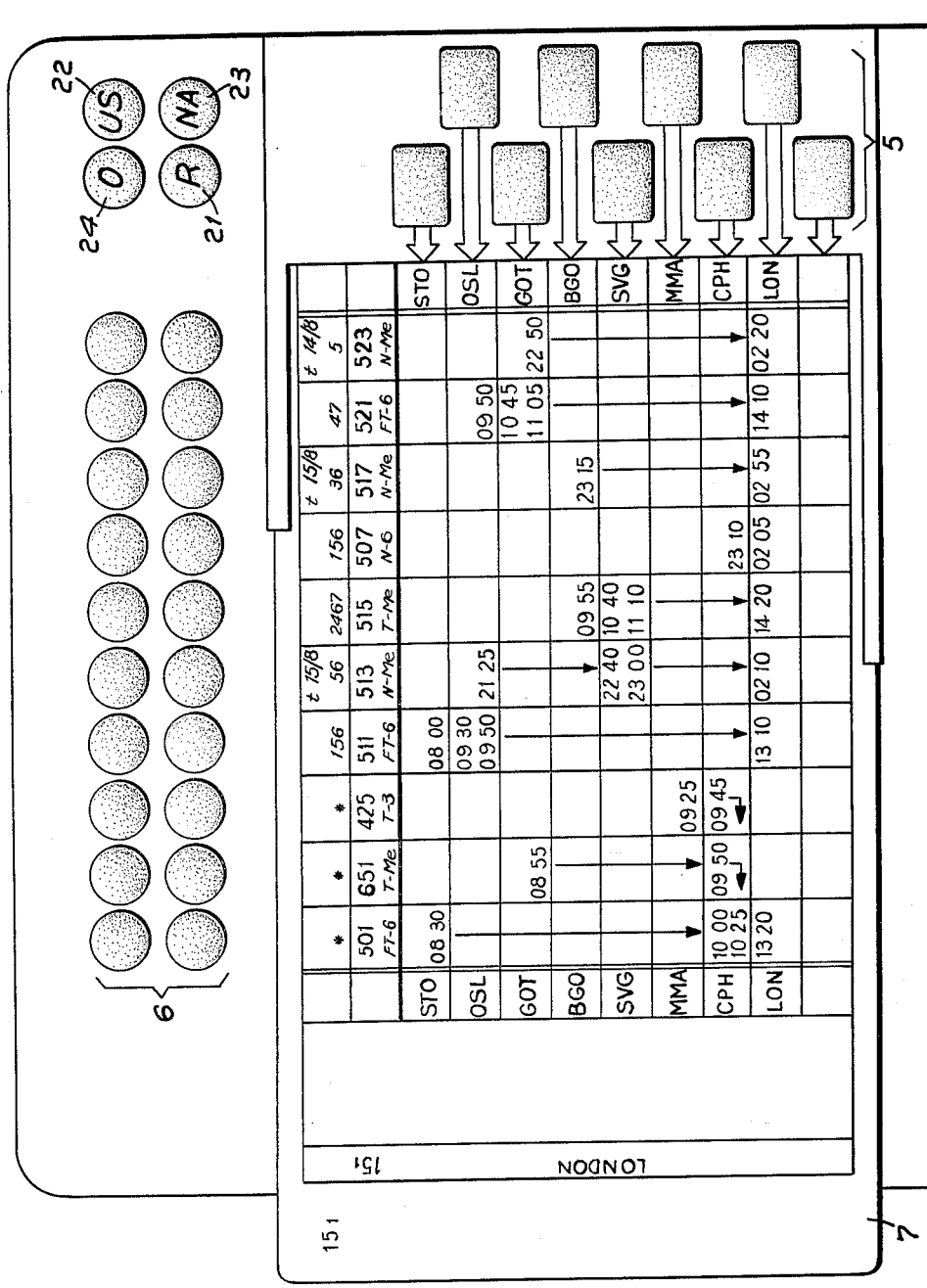
FIG. 1A shows the keyboard of the agent set (flight enquiry desk), top part.
Figure 1B:
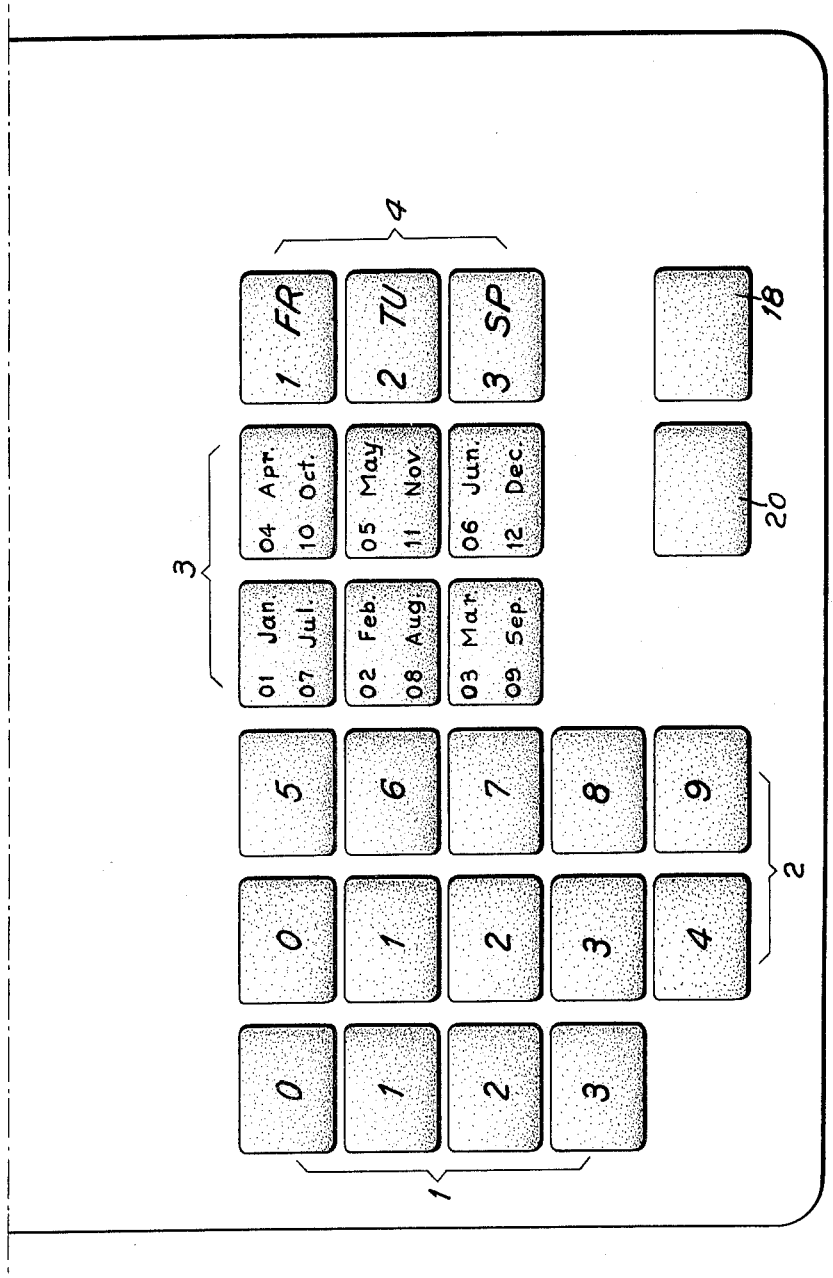
FIG. 1B shows the keyboard of the agent set (flight enquiry desk), bottom part.

FIGS. 1A and 1B show a top view of an agent's set. The set is provided with a keyboard, consisting of several groups of self-holding keys (which are automatically locked within the individual groups in accordance with a selected scheme) with the aid of which the following information is fed-in:

Day of flight, [keys 1 (tens), keys 2 (units)],
Month of flight, [keys 3 (respectively one key for two months)],
Class, [keys 4] and
Originating stopping point or destination stopping point, [keys 5].

The connection to the central office is effected by the releasing key 18 after all of the necessary data has been fed-in. The system provides the information in reply to the enquiry, and indicates this information in the lamp field 6. The lamps of the top row are red, and those of the bottom row are green. The selected combinations of light conditions have different meanings as described hereinbefore.

Each reservation clerk's position is provided with a set of specially prepared, standardized timetable charts 7 containing all data necessary for dealing with the customer's request. By inserting a timetable chart (destination plate) into a slot provided in the agent's keyset, connection is established via a suitable notch arrangement in order to obtain the availability criteria relating to the specific flights mentioned on the chart (or plate).

Figure 2:
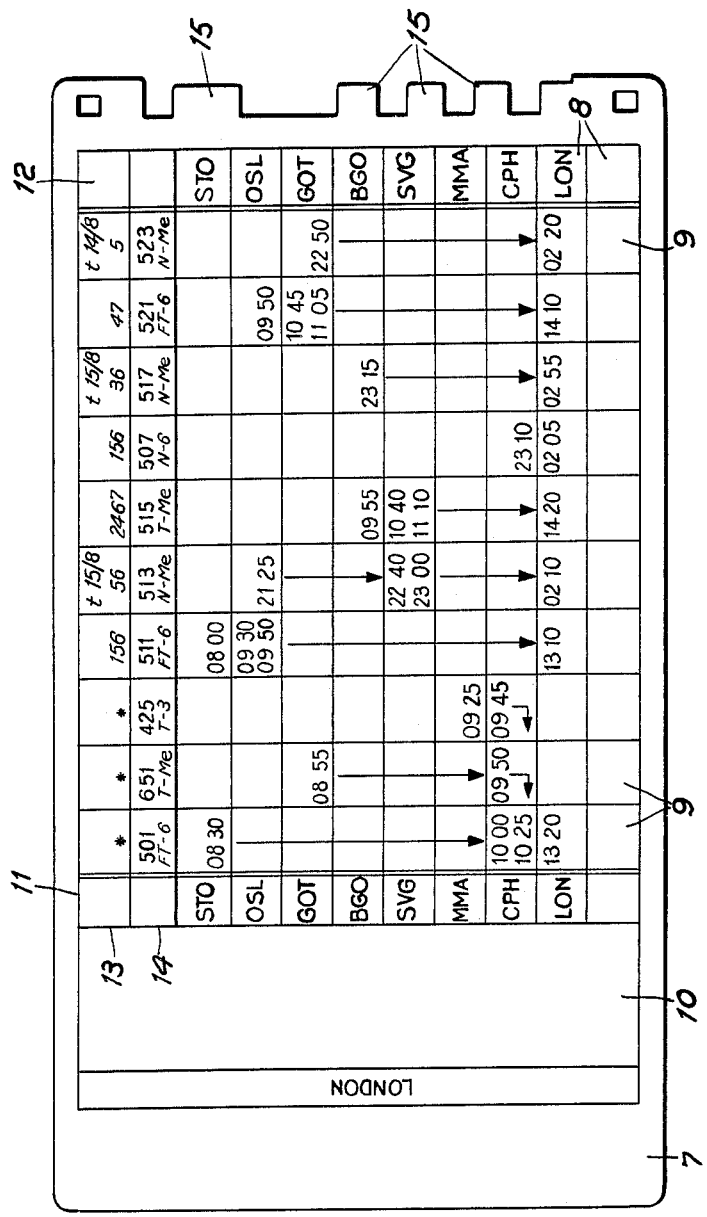
FIG. 2 shows the flight chart.

FIG. 2 shows a timetable chart (destination plate) 7 consisting of a metal plate, on both sides of which there is affixed a sheet 10, the timetable, which is divided into nine lines 8 and ten columns 9. Each of the 90 coordinate areas or cells thus defined relate to the name of one airport (stopping point). The names of the take-off and landing stations are printed in two special columns 11 and 12 along side of the respective line in accordance with the international three-letter name code showing the city abbreviation. In the present case only eight of the nine lines are occupied. At the head portion of the timetable chart there are two lines 13 and 14 for the usual remarks regarding flight numbers, class possibilities, etc. Furthermore, each timetable chart contains a characterizing number. The right-hand edge of the metal plate 7 is provided with code notches 15 so that the selected side of the plate is unambiguously characterized by a number. When inserting the card into a corresponding slot of the agent's keyset from the left-hand side, the code notches actuate small contacts; this operation is then electrically evaluated. The four lamps in the right-hand top corner of the agent's keyset serve to indicate the operating condition. The lighting of lamp 21 indicates that the request has not been completely received at the central office, and that for this reason the request key 18 has to be depressed again. The lighting of the red lamp 22 indicates that the central-office equipment is not operating correctly, and thus suggests the existence of trouble in the system. The lighting of the white lamp 23 indicates that the advance-booking period has been exceeded, in other words, the keyed-in date is lying more than 70 days ahead of the valid date. These flights have not yet been stored in the central-station equipment, and a space-availability information cannot be given at present. The white lamp 24 is provided whenever several keysets are to be connected with the central station via a common connecting box; this lamp is lit whenever the respective connecting box is seized by another keyset. Of course, if the lamp 24 is lit, then no information can be given at the respective operator's position, but all the preparatory operations for providing an availability information can be carried out, in other words, the corresponding date keys may be depressed.

The insertion of plate 7 not only serves the purpose of providing the system with a selection criterion but also brings the respective timetable chart into a defined relation to the station keys 5, and to the availability-indicating lamps 6. One station key is assigned to each line of the inserted chart and a pair of lamps are assigned to each column. The station keys are designed in such a way that in no case can more than two keys be depressed at the same time.

Hence, when arranging the stations along one column in the timetable charts each flight connection mentioned in that column is capable of being interrogated by depressing two station keys 5. If furthermore, the pertaining information is observed on the lamps of the respective column then its assignment to the connection keyed into this column is easily recognized.

Normally, only one station (airport) is assigned to each line of the timetable chart (destination plate) and only one flight is assigned to each column. This, however, is in no way a prerequisite, especially as far as the assignment of the stations (airports) to the lines of the chart is concerned. Since every existing flight is marked on the storage drum by its position on the chart in relation to the plate number, page number, column number, key number of the originating station, and by the destination, a particularly high extent of freedom in designing the cards is provided. In particular, several flights may be arranged below each other in one column, or in one column there may be merely marked a suitable geographical section of a flight route. Furthermore, connection services can be marked and can be interrogated in the course of one operation, and one flight may either be completely or partly repeated on different charts.

In the case of connection services, where the different flight legs are listed in different columns, the lamp of that particular column, in which the keyed-in originating stopping point is arranged, is lit. In order that one flight can be repeated completely or partly on different charts, the storage unit is provided with a connection translator, by means of which the same availability information can be provided on the magnetic drum. This translator is described hereinafter.

It is a feature of the present enquiry system that the information provided upon request, covers all connection services mentioned on the inserted chart, i.e. to all connection services corresponding to the keyed-in data (airport No., flight No., date, class). It is possible with the ten columns and the associating pairs for the system to provide ten enquiries at a time. By geographically organizing the charts it is possible in the course of one single request to give the customer all of the information regarding the existing flight possibilities and the space availability. This substantially adds to a speedy handling of air-travel reservations and, consequently, to improved customer service.

Figure 3A:
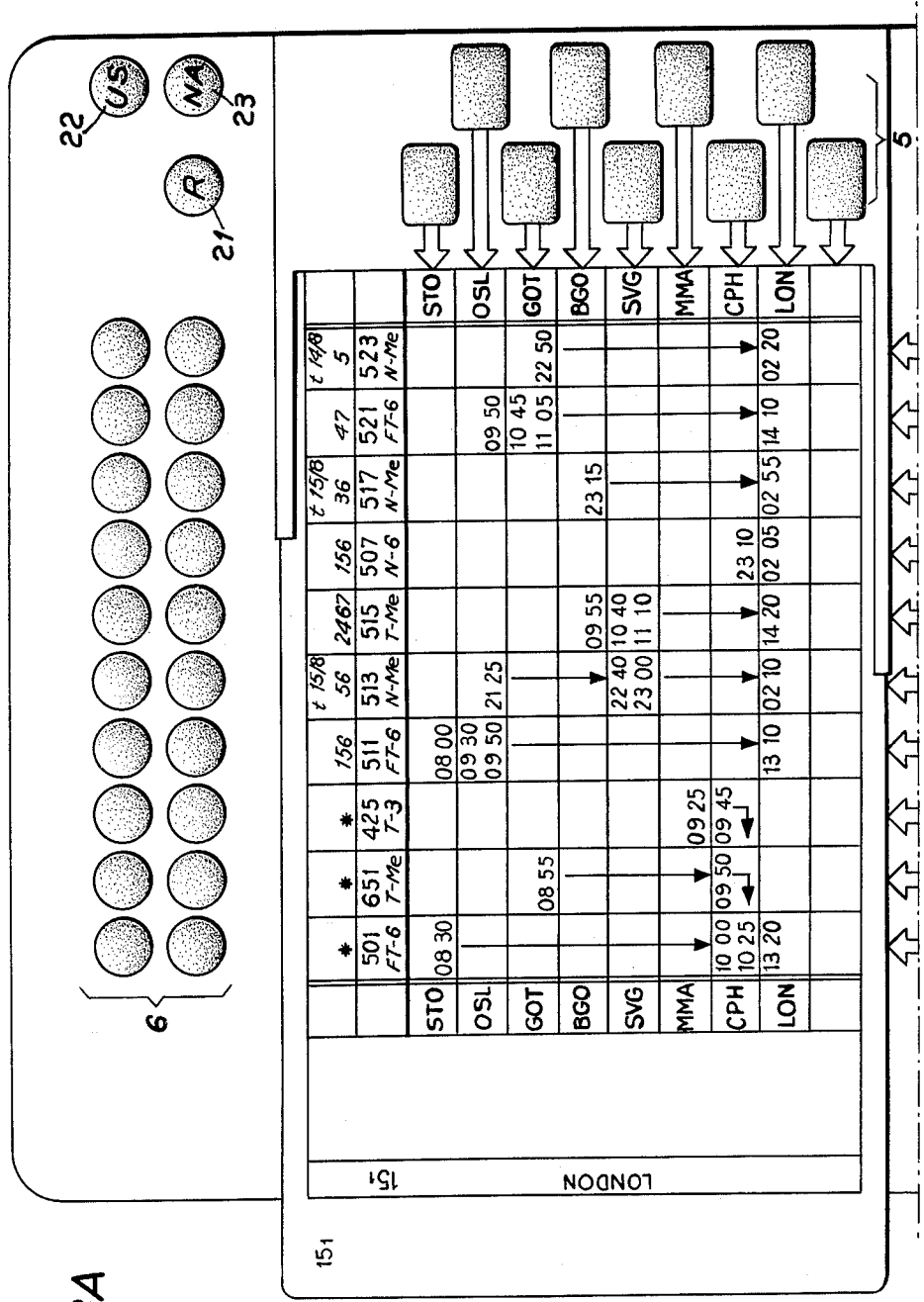
FIG. 3A shows the keyboard of the master set (flight setting desk), top part.

To set the availability information at the central office a flight-setting desk (which differs from an interrogation desk only in that one key is provided per column below the chart or plate slot) is used. FIGS. 3A and 3B constitute plan views of respective top and bottom portions of a flight-setting desk with the additional keys 16. The keys 16 permit the selection of that particular flight whose availability criterion has to be altered. Furthermore, four keys 17 are provided for fixing one of the four possible availability criteria, as well as the releasing key 18 for carrying out the prepared alterations.

The key 19 serves the switching-over from the operating condition "writing-in" to the operating condition "interrogation," while the key 20, as in FIG. 3, serves to cancel the lamp indication.

To review, the flight-enquiry and flight-setting desks consist of:

The information keys for feeding in the data concerning the day, the month, the class (respectively, in addition; the column and the availabiilty criteria in the case of the flight-setting desk);

The function keys for releasing the request or writing-in process, or extinguishing the lamp; the lamp panel for indicating the availability criteria;

The card slot (in which is inserted a notched plate or chart) with the micro-switches for feeding-in the data relating to the number and the side of the cards.

As previously mentioned all of the information keys are of the self-holding magnetic type. The hold circuits of these keys are arranged in such a way that upon depression of a key belonging to a group of keys in which another key has already been depressed, the hold circuit of the previously depressed key is interrupted. If, of the nine station keys 5, in addition to two already depressed keys, a third one is actuated, then a well known type of latching circuit causes both of the previously depressed keys to be released again. In this case the operator has to decide which keys are to be depressed again, in order to select a complete flight information, consisting of both an originating and a terminating point.

In the case of the characters which are keyed-in in accordance with the "1 out of $n$"-code, the contact assemblies of the magnetic keys (self-sticking keys of the magnetic type) also take over the code conversion. Characters of the "1 out of $n$"-code consist of one $l$-element and of $(n-1)$ 0-elements, which are formed with the aid of the keyboard by depressing one of the $n$-keys, i.e.:

For the data relating to months: $n=6$ (six-months period),

For the data relating to the tens of the days: $n=4$ (0, 1, 2, 3),

For the data relating to the units of days: $n=10$ (0, 1 . . . 9),

For the data relating to classes: $n=3$ (1, 2, 3).

These four pieces of information are converted with the aid of the magnetic keys into the less redundant, but checkable "2 out of 5"-code, while the originating and terminating stopping points are transmitted in the "2 out of 9"-code to the processing system. Since, by reversing plate 7 (FIG. 2) the code notches (or edge codings) relating to the tens and unit position change their position in a mirror-inverted manner, a switching-over of the code elements is effected (switching contacts), controlled by the notches 15, thereby identifying either the front or the rear side of the plate. In many cases flight-enquiry desks are located in neighboring rooms or offices, which are used seldom or as an alternate. For this reason several desks may be connected to one common line connector (connecting box) which, in turn, has only one connection to the central processing system.

These line connectors take over the technical functions of effecting a transmission path to the central processing system and, preventing faulty operations of the numerous agent positions connected thereto. There are two different ways (discussed below) for effecting the transmission of the request information to the processing system, as well as the retransmission of the availability information. Those line connectors arranged in the same building in which the central processing system is accommodated would be connected to the system by way of a multi-conductor ring-line system.

The disposition of the principal functional elements of the space-reservation system is shown in FIG. 4 in schematic form. Four enquiry desks 25 are provided for the short-distance run, connected in pairs to one line connector 26; and ten enquiry desks 27, connected five to one line connector 28 are provided for the long distance run. The line connectors 26 are connected via ten lines 29 to the central processing system 30. This central processing system 30 consists of the input-storage units 31 for storing the input information, of the output-storage units 32 for storing the availability information, and of the actual processing unit 33. The availability information is fed via ten lines 34 to the individual line connectors 26.

The information is transmitted in groups of two decimal numbers, represented in the "2 out of 5"-code, to the processing system, and the availability information consisting of twenty binary digits, is transmitted via the lines 34 to the line connectors. This serves to reduce the high number of lines and line switches normally required in the case of a completely parallel connection and, serves to keep the expenditures on necessary timing elements and control circuits at a minimum.

With respect to the line connectors 28, which are located further away from the central office (long-distance area), the transmission is effected by the galvanical (electrical) connecting-through of leased telephone lines at a transmission speed of 50–100 Baud. The information, which is to be transmitted, stored in the electrical contacts of the actuated input device, is scanned bit by bit and passed on to the line via a telegraph relay to the electronic storage unit (Register) 35 at the central office.

Subsequent to the processing of the enquiry word the answer is transmitted back over the lines 34 and is received in the respective line connectors 26 or 35 in a receiving register which is composed of relays. The contacts of these relays switch on the indicating lamps until the operator (agent) has provided the requesting customer all of the information desired. The operator then either operates the cancellation key 20 or performs another keying-in. Any change in the keying-in of the information or the withdrawal of the timetable chart extinguishes the indicating lamps.

Details of a line connector 26 are shown in FIG. 5, with respect to the connection of two enquiry desks 25. The corresponding pushbutton contacts 36 and 37 of the two enquiry desks are connected together in the line connector, and are assembled to form four category groups, each category group consisting of that category on each desk. The diodes 38 or 39 are for decoupling purposes. The four category groups consist of group 40 representing the plate number, of group 41 representing the side of the plate, the class and the stations, of group 42 representing the month and column (not shown for reasons of clarity) as well as of group 43 for the tens and units of the day of the month. The upper diodes and contacts belong to one enquiry desk, and the lower diodes and contacts to the other enquiry desk connected to this line connector. The timing-pulse generator 44 produces four successive impulses for transmitting the information to the processing system and thus consecutively connects the four line groups 40–43 to the ten ring-line systems 29. The availability information is stored in relays 46 via the ring lines 34. The transmission of the availability information is effected in two groups of ten positions each. The timing-pulse generator 44 likewise serves to control the two groups 47 and 48. The storage relays 46 are of the self-sticking type and, via one front contact, serve to switch the indicating lamps on either the one or the other enquiry desk. The timing-pulse generator 44 is controlled via the signal lines 45 extending from the central processing system, by the marking distributor 49 (FIG. 4) when it has reached the contact position corresponding to the respective line connector. It is then retained there. The selection of the key or pushbutton conacts and of the indicating lamps of the proper one of the two connected enquiry desks is effected by the desk switchover contacts 50 of a selecting relay not shown in FIG. 5.

The line connectors for the long-distance range are designed in accordance with the different operating conditions. They permit the connection of a maximum number of five enquiry desks. The timing-pulse generator of these line connectors provides 39 timing pulses for the bit-wise transmission in the forward direction, and 22 timing pulses (20 bits for the information +2 bits for the checking) for transmission in the backward direction.

In order to suppress an effective keying-in at more than one of the possible two or five enquiry desks, the releasing key which is depressed first blocks the other desks until the first enquiry desks has received its availability information, whereupon the operation of the next releasing key is permitted. Although the release of the enquiry is still blocked the information keys may, as previously mentioned, already be operated.

The system is laid out for operating with a maximum number of one hundred connections. Of the possible one hundred connections, however, only one may be connected to the central processing system at any time.

For the connecting-through of the enquiry desks to the cenrtal office the marking distributor 49 (FIG. 4) is provided. This marking distributor consists of an electronic counter with the two decade stages 51 and 52, which count to 100. Each of the one hundred output connections are assigned to one line connector via the AND—connections 54. The counter 51, 52, is stepped by the central pulse generator 55 which, in turn, is stopped by a check signal via the line 45; and is restarted by a program signal via line 56, provided by the central processing system 30. The one hundred output of the counter are connected via the one hundred star lines 53 to the one hundred enquiry desks, and are adapted to transfer the marking potential to the subscriber each time the counter are connected via the one hundred star lines 53 to remains there. If a contact corresponding to the call key had already been closed prior to this time position, then a marking potential is applied via this contact and the ring-line 45 connecting all subscribers, as a check signal back to the marking distributor, and retains both the pulse generator 55 and the counter 51 in this particular position. During this checking or testing time the respective enquiry desk is connected through on the transmitting and receiving side to the central processing system 30.

The processing is now performed in the following phases with a duration of about 80 ms. in accordance with a fixed program:

(1) Address-transmission and code checking,
(2) Interrogation of the connecting translator,
(3) Interrogation of the enquiry storage unit, and intermediate storing of availability information,
(4) Retransmission and storing of the availability information.

At the end of this succession an end-of-program impulse is transmitted from the central processing system 33 to the impulse generator 55 for starting the latter which then, in turn, effects the stepping-on of the counter until the next testing is effected.

The central processing system 30 (FIG. 6) consists of:

The input-storage units for the input information transmitted by the flight enquiry or flight setting desks,
The connecting translator 57, and of the enquiry-storage units on the two magnetic drum-storage devices 58 and 59,
The date translator 60,
The code-testing and code-converting circuits 61, and of the program control.

The individual functional elements of the central processing system are shown in FIG. 6 in schematic form. The input-storage unit consists of the input storage 311 for the day, 312 for the month, 313 for the class, 314 for the card number, 315 for the station number, and 316 for the column number. The information keyed-in and transmitted to the central office is at first stored in the storage units 311 through 316, and is tested by the code-testing circuits 611–616.

This testing of the code can be carried out with the aid of conventional circuit arrangements, for example, the circuit arrangement as shown in FIG. 7 may be used for carrying out the "2 out of 5"-code test. The inputs are each connected to one of the five channels in which the information is likely to appear. With the aid of this circuit arrangement it is then possible to ascertain whether more than two or less than two, or exactly two channels are marked. If the transmission is correct, that is, if and only if two of the five channels are marked, a corresponding potential is formed at the output A for indicating the correctness of the code.

The code conversions take place in the code converters 617–622. Such types of code converters are sufficiently known in the art. For example, for converting the "2 out of 5"-code into a "1 out of 10"-code the circuit arrangement shown in FIG. 8 can be used. One of the relays 62–66 is assigned to each input channel. Each of these relays is provided with four contacts $a$ through $d$, as indicated in FIG. 8 by the designations 62$a$ thru 62$d$ applied to the contacts of relay 62. The contacts are arranged into the ten output lines so that upon marking of two input lies only one of these ten output lines can be occupied.

With the aid of the connection translator 57 (FIG. 6) a check is made upon each request as to whether the request address has to be traced back to a different address, under which the availability criteria are stored in the request-storage unit 58, 59, or this is not necessary. It has been mentioned hereinbefore that the same availability information may be assigned to different timetable charts, and that in this case the availability information, which is inserted only once in the main storage, must also be available to other charts. Accordingly, this assignment is performed by the connection translator. If a secondary card is concerned, then the search address belonging to the enquiry address is ascertained in the connection translator. Naturally in the case of the primary chart, both the enquiry and the search addresses are identical. In accordance with this function the process of assignment may be regarded as a genuine storage-reading process in the course of which either the existence or non-existence of an address, namely of the enquiry address in the storage unit is determined. In the case of a successful search the search address assigned to the enquiry address is issued.

For this reason a channel of 36 tracks on the magnetic drum-storage device 59 is used as the connection translator, and the remaining 280 tracks on the magnetic drum are used like the 320 tracks on the drum-storage device 58 as the enquiry-storage unit. FIG. 9 shows part of a development of that particular portion of the drum surface 59 on which the connection translator 57 is arranged.

As will be seen from FIG. 9, each flight assignment includes two succesively following angular positions 72. In the even-numbered angular position (0, 2, 4 . . . 998) those of the request addresses 73 (consisting of the card number 74 and the column number 75) which are supposed to be transferred to the search addresses 76 (again consisting of the card or chart number 77 and the column number 78) are stored. During one complete rotation of the magnetic drum all enquiry addresses are read via the intermediate storage unit 79, and are compared in the address comparator 80 (FIG. 6) with the keyed-in enquiry address. In cases where an identity is established, the associated search address, standing in the same angular position, is read and stored in a buffer storage.

Since, in the case of a registration of the same connection on different regional timetable charts, the same station names do not need to appear in the same lines of the chart, the numbers of the chart lines have to be rearranged in a corresponding manner. This is effected in the odd-numbered angular positions (1, 3, 5 . . . 999) which are divided into nine storage cells 1′, 2′, 3′ . . . 9′ corresponding to the nine station numbers of the enquiry address.

The function of the connection translator will now be described with reference to an example.

The connection indicated for column 7 (FIG. 9) of the timetable chart 312 (the three-digit time table chart number is composed of the two-digit plate number (31) and of the one-digit side number (2=rear side)) is not registered under this address in the enquiry-storage unit, but under the address of the corresponding connection, indicated for column 2 of chart 171. For this reason, when selecting the chart number 312, and with respect to the column 7 thereof, the address 312/7 is searched for in all even-numbered angular positions of the connection translator. This address will be found in the angular position 4 shown in FIG. 9. Thereupon the search address 171/2 indicated under the same angular position is read out and stored. Since, for example, the station numbers 2 and 4 were keyed-in at the request as being the originating and terminating stopping points, the contents of the storage cells 2′ and 4′, namely the values "2" and "5" are read out in the fifth angular position, which follows the fourth angular position, and are subjected to an intermediate storing. From this it may be taken that the originating station is mentioned on chart 312 as well as on chart 171 in the second line, but that the terminating station is mentioned on chart 312 in the fourth line, and on chart 171 in the fifth line. In this way the search performed by the connection translator, has resulted in providing the information that the connection which has been selected under the address 312/7 for the lines two and four is to be searched for under the address 171/2 for the lines 2 and 5 in the enquiry-storage unit.

With respect to the enquiry-storage unit 58, 59, when using 320+280 recording tracks, and 1000 bits per recording track, a storage capacity of 600,000 bits is available. When selecting the storage division and the search processes the following points of view had to be taken into consideration:

(1) The address, with respect to which an availability criterion has to be stored or read-out, is composed of the address-components chart number (200), column number (10), class (3), leg combination (36), week number (10), and day of the week (7), and accordingly has an information content which is large with respect to the availability criterion also belonging to the address, of only two bits. The numbers in brackets indicate the possible number of variations of the respective part of the address.

(2) Of the $200 \times 10 \times 3 \times 36 \times 10 \times 7 \approx 15 \times 10^6$ possible combinations, only a relatively small number are actually utilized, because the timetable charts are only partly utilized with respect to the number of columns and lines, and because the flights do not always contain all three classes, and also because not all of the flights are made daily. However, all of the combinations are permissible; in other words, they may occur in the long run by omitting other combinations.

For the reasons mentioned in paragraphs 1 and 2 the two storage units 58 and 59, are organized differently.

For connections which are served several times a week, the storage unit 59, subdivided into seven parts corresponding to the seven days of the week, is used. Each of the seven parts is composed of one address group, and of ten information groups. The "week day" selects the proper part, and the "week number" selects the proper group, of information tracks. In the address portion of the area, the desired parallel-recorded address, consisting of 20 bits, is searched for by way of comparison. Upon establishing the identity with the wanted address, the availability criterion, to be found under the same angular position, is transferred to an intermediate storage device.

FIG. 10 shows part of a development of the drum surface 59. From the left to the right the drum is divided into the seven sections 82 (Monday), 83 (Tuesday) . . . 88 (Sunday). Each section contains twenty recording tracks for the address (which consists of the card or chart number, the column number, the class and station combination), as well as twenty recording tracks for the availability criteria relating to ten weeks.

For the connections served daily or almost daily, the storage units 58, divided into two identical parts, is used. Each part contains twenty address-recording tracks and 70×2=140 information tracks. Since the correct angular position is obtained by comparing the identity of all addresses with that of the wanted address, the correct information group is selected by the combination of week and day.

FIG. 11 shows the division of the drum-type storage device 58 with reference to part of a development of the surface of this drum. In the case of drum 58 each of the two sections contains 20 address-recording tracks from the left to the right, fourteen recording tracks each for the availability criteria of the week 0, of the week 1, and so on, to week No. 9, hence a total of 20+140=160 recording tracks.

The recordings into the enquiry tracks in FIGS. 10 and 11 have the following meaning as already mentioned:

00   Connection does not exist, no lamps
01   Space available, green
10   Space occupied, red
11   Space conditionally available, green and red.

Since each of the ten possibly offered search addresses may be stored either in the storage unit 59 or in one of the two parts of the storage unit 58, there are provided 10×3=30 comparators. The inputs on the storage side of these comparators are assembled to form three groups of ten each, and the inputs on the input side of the comparators are assembled to form ten groups of three each. The outputs of the comparators, delivering the identity signal, effect the reading-out of the availability criterion, which is stored under the momentarily applied angular position of the respective part, into the intermediate storage device assigned to the eighth column of the chart. In FIG. 6 the two comparators 80 and 81 are shown in schematic form. Accordingly, all availability criteria are read out during the time of one complete rotation (cycle) of both drums.

FIG. 12 shows the date translator. This translator serves to translate the date, which is stored in the date register, via a translator-plug board into the number of the day (1 out of 70) as well as the number of the week (1 out of 10), and further the number of a week-day (1 out of 7). The information stored in the input storage units 311 and 312 is first converted in the code converters 89, 90 and 91 into the "1 out of 4," "1 out of 10" and "1 out of 6"-code respectively. The first four and ten outputs form the four lines and ten columns respectively of the subsequently arranged diode matrix 92. Of the 4×10=40 intersecting points thereof the ones corresponding to the combinations 00 and 32 . . . 39 remain unused, while the lines corresponding to the combinations 01 . . . 31 form the columns. The six lines leading from the code converter (2 out of 5) into (1 out of 6), form the lines of the resistance matrix 93. This resistance matrix is the image of a six-months calendar comprising six months with a maximum of 31 days each. The 6-times 31 voltage-divider points of the matrix 93 are led to 186 sockets of a "calendar field." Next to this "calendar field" a further "week field" is arranged consisting of seven-times 10 sockets, and forming the front side of the diode matrix 94. With the aid of plug cords, the sockets of the "calendar field" are connected in a calendarwise manner to the sockets of the "week field," so that e.g. the 1st of April 1959 is connected to a socket representing the Wednesday, and the 2nd of April is connected to a socket representing the Thursday of the same week. By marking the number of the month 4 (April) and the number of the day 01 in the matrix 93, the first mentioned "Wednesday socket" is fully marked, while all sockets of the "Wednesday field" 94, which are connected to the "calendar-field sockets" of line 4 or of column 01, are only half marked, and all of the remaining sockets are not marked at all. In cooperation with the subsequently arranged 7+10 discriminators 95, the diode matrix 94 assures, that in the case of a full (or complete) marking of a socket of the "week field," one out of ten numbers of the weeks and one out of seven numbers referring to the days of the week are selected. The operator or attending person merely has to see to it that at the end of each day the plug of a plug cord on the side of the calendar fields is pulled out of the socket indicating the end of the respective day, and is plugged into the socket of the next free day of the calendar which is 70 days in the future.

FIG. 13 shows the socket field of the date translator comprising 186 sockets 96, which are subdivided into six rows of 31 sockets each. Each row represents two months spaced six moths apart. Of the 186 sockets, 70 sockets, successively following in accordance with the date, are connected to plug cords 97. These cords are assembled to form seven rows of ten cords each; that is, each row contains one week-day for the ten weeks of the advance-booking period. Accordingly, with the aid of these 70 cords the connection is established to the days of the calendar lying within the advance-booking period. In the example of FIG. 13, this period extends from September 11 to November 19. The connection between the sockets and the cords is established in the manner as described hereinbefore.

In this way upon feeding-in the date via the enquiry desk, access is first permitted to the proper date socket in the date translator, and from there via the plugged-in cord to the proper recording track on the magnetic drum. However, at the same time it is also ensured that no track is interrogated on the magnetic drums when feeding-in a date not lying within the advance-booking period.

The program control may be made according to the character of a special-purpose system, by selecting one of several wired programs. The proper program is selected by the model of the input set and the mode of operation.

Program 1.—Enquiry regarding availability information, from the agent sets.
Program 2.—Manual input of availability information, from the master sets.
Program 3.—Automatic input of availability information from a control set belonging to the central processing system. Upon the completion of this program, which is daily terminated by the day that follows, the availability criteria of the new day are automatically re-written, being controlled by the criteria of the same day of the previous week. Re-writing is done in such a manner that in the informations "green," "red" and "red-green" of the previous week, the information "green" is written, while for the information "not on hand," the information "not on hand" is written once more.
Program 4.—Input of address and the information "green" when including new connections from the control set.
Program 5.—Input of address and information "not on hand" when including new flights from the control set.
Program 6.—Input of enquiry addresses in the connection translator from the control set.
Program 7.—Input of sought addresses in the connection translator from the control set.
Program 8.—Input of rearrangements of stations in the connection translator, from the control set.
Program 9.—Checking the addresses of the information memory, from the control set.
Program 10.—Checking the enquiry addresses of the connection translator, from the control set.
Program 11.—Checking the searched addresses in the connection translator, at the control set.
Program 12.—Checking the rearrangement of stations in the connection translator, from the control set.

For each program, one of twelve program lines are marked, either by the type of input set or by depressing a program key, whereupon the program runs its course.

Marking the program line "enquiry availability criteria" has the following effect: in the magnetic drum memory 59, the approach of the boundary position (angular position 0 of the drum) is awaited and then, for the duration of one full drum revolution, the input addresses are sought within the range of the connection translator of this drum. Depending on whether these enquiry addresses are found in the memory or not, the next step is to search for the assigned address or the original address, both in the selected address channel of information memory 59, as well as in the two address sections of information memory 58, until each of these address channels has been fully scanned. Where the address read coincides with one of the (maximum) ten simultaneously offered addresses, the flight information under the same angular position is picked out, transmitted to the point of enquiry and registered there. Upon completion of the entire program, the cycle ending impulse effects the consecutive connections of the scanner.

While we have described above the principles of our invention in connection with specific apparatus, it is to be clearly understood that this description is made only by way of example and not as a limitation to the scope of our invention, as set forth in the objects thereof and in the accompanying claims.

What is claimed is:

1. A space information and reservation system for railroad, airline, or any other conveyance in which inquiries regarding the space availability, as well as space reservations, can be made by requests from any suitable location with respect to a relatively long advance reservation period, comprising a plurality of operator's positions, chart means at each operator's position representing stations and voyages arranged in rows and columns of a predetermined uniform grid pattern, central electronic equipment, means for selectively connecting said operator's positions to said central electronic equipment, storage means in said electronic equipment, means for recording on said storage means data including the availability of each route or partial route of a voyage for each day of a predetermined plurality of days, as a group, together with an address for said group comprising data identifying the originating and terminating stations of said route or partial route corresponding to rows of said chart means, and data identifying said chart means and the columns thereof, key means at each of said operator's positions representing said plurality of days, and said station rows of said chart means, means operative when an operator's position is connected to said central electronic equipment and responsive to the operation of key means at said connected operator's position identifying one particular day and an originating station and a terminating station for reading out from said storage means within one single operation of not more than two complete scannings of said storage means, data pertaining to all voyages relation to one route schedule, including said partial routes, for said one particular day, and transmitting signals representing said data to said connected operator's position, and means at each operator's position, in cooperative relation to said chart means and responsive to said signals, for simultaneously indicating the availability with respect to space of all voyages between said originating and terminating stations represented on said chart means.

2. A space information and reservation system as defined in claim 1, in which the chart means at each operator's position has voyages arranged in columns and stations in rows and the key means comprises a key aligned with each row of the chart for identifying the originating and the terminating stations, and the indicating means comprises lamp means aligned with the columns of said chart means and responsive to signals from the central electronic equipment for simultaneously indicating the space availability of the voyage or partial routes associated with the respective columns between the originating and terminating stations.

3. A space information and reservation system, as defined in claim 2, in which the chart means comprises a plurality of route charts, each substitutionally affixed to a plate provided with switch-operating means on the edge thereof, and the means for selectively connecting the operator's position with the central electronic equipment comprises plate-holding means for accommodating one of said plates and switch means cooperating with the switch-operating means on the edge of a plate inserted in said plate-holding means for automatically selecting the addresses on the storage means of said central electronic equipment corresponding to the voyages relating to the particular route chart on the plate inserted in said holding means.

4. A space information and reservation system, as defined in claim 3, in which data pertaining to a partial route of a voyage listed on several route charts is stored only once in the storage means at the central electronic equipment, the means for selecting the address comprising a translator and means for causing said translator to select that particular address in response to signals received from any one of the plates supporting said several route charts.

5. A space information and reservation system, as defined in claim 4, further comprising key means at certain operator's positions aligned with the columns on a chart positioned in the holding means designating the voyages for recording a reservation on the storage means of the central electronic equipment at the address selected by the chart-carrying plate at said position and the key of the central electronic equipment at the address selected ing the originating and terminating stations.

References Cited by the Examiner

UNITED STATES PATENTS

| | | | |
|---|---|---|---|
| 2,549,071 | 4/1951 | Dusek et al. | 340—153 |
| 2,564,410 | 8/1951 | Schmidt | 340—153 |
| 2,568,756 | 9/1951 | McWhirter et al. | 340—153 |
| 2,622,142 | 12/1952 | Jackel | 340—153 |
| 2,883,106 | 4/1959 | Cornwell et al. | 340—152 |
| 2,910,238 | 10/1959 | Miles et al. | 340—153 |
| 3,134,016 | 5/1964 | Connolly et al. | |

NEIL C. READ, *Primary Examiner.*